United States Patent
Imai et al.

[11] Patent Number: 5,818,596
[45] Date of Patent: Oct. 6, 1998

[54] FILM THICKNESS MEASURING APPARATUS

[75] Inventors: Masayuki Imai, Kofu; Masaaki Amemiya, Shikishima-cho; Kazuhide Hasebe, Shirane-machi; Norihito Kaneko, Nirasaki, all of Japan

[73] Assignee: Tokyo Electron, Ltd., Tokyo-to, Japan

[21] Appl. No.: 922,756

[22] Filed: Sep. 3, 1997

[30] Foreign Application Priority Data

Sep. 6, 1996 [JP] Japan ................................. 8-257834

[51] Int. Cl.$^6$ ................................................ G01B 11/06
[52] U.S. Cl. ...................................... 356/381; 250/559.27
[58] Field of Search ..................................... 356/381, 382; 250/559.27, 559.28

[56] References Cited

U.S. PATENT DOCUMENTS 5,393,624   2/1995   Ushijima ............................ 356/381

*Primary Examiner*—F. L. Evans
*Attorney, Agent, or Firm*—Beveridge, DeGrandi, Weilacher & Young, LLP

[57] ABSTRACT

A sample is placed on a sample receiving stage for receiving the sample. The sample is transferred one at a time to a measuring table, and a thickness of a thin film formed on a surface of the sample is measured by irradiating the surface of the sample with a measuring light beam. A covering structure is disposed between the sample receiving stage and the measuring table to define a sample transfer space and a measuring space in which the measuring table is disposed. A high-purity purging gas containing only a very small amount of contaminants is supplied through purging gas supply devices into the transfer space and the measuring space covered with the covering structure.

12 Claims, 4 Drawing Sheets

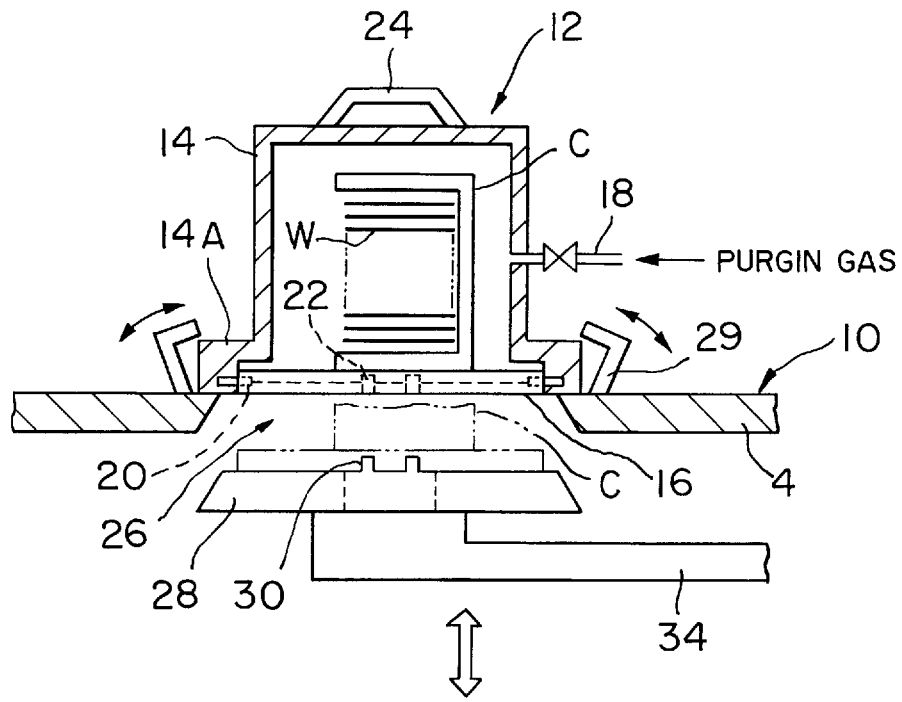
F I G. 2
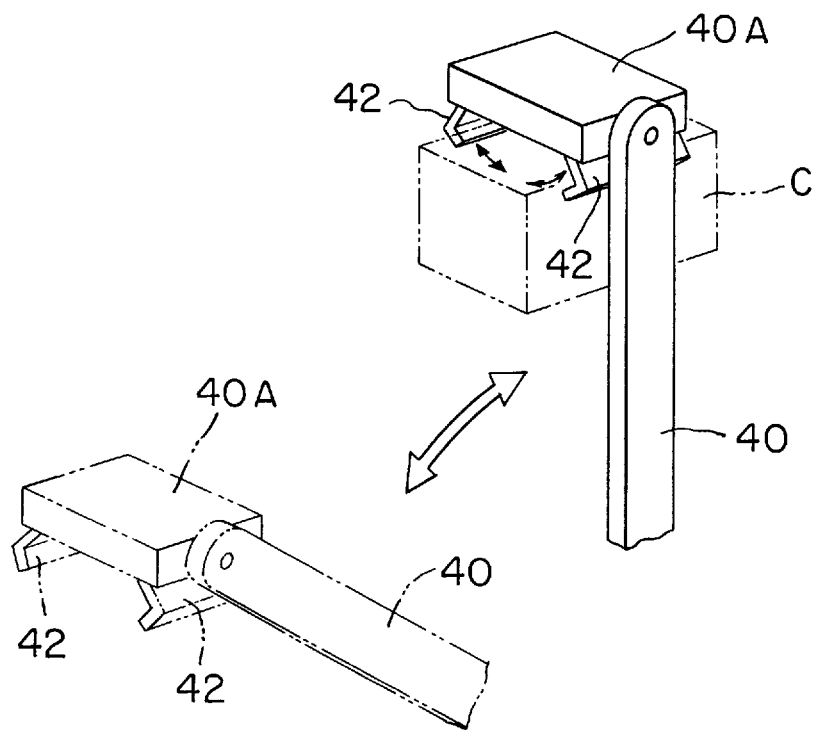
F I G. 3

FILM THICKNESS MEASURING APPARATUS

FIELD OF THE INVENTION

The present invention relates to a film thickness measuring apparatus for measuring the thickness of a thin film formed on a surface of a semiconductor wafer or the like.

BACKGROUND OF THE INVENTION

In general, desired circuit elements are formed minutely by repeatedly subjecting a semiconductor wafer to film forming processes and etching processes. Because of the recent progress of technology, the increase of the storage capacity of semiconductor devices and the enhancement of the processing speed of microprocessors have become more important, and the further increase of the scale of integration of elements of integrated circuits and further miniaturization of integrated circuits have been desired.

Under such circumstances, highly accurate thickness control has been desired for forming thin films. Although a bilateral tolerance for thermal oxide films of, for example, 200 Å in thickness as gate oxide films used in fabricating transistors for conventional microprocessors or the like is on the order of ±5 Å and such thermal oxide films do not cause problems in the characteristics of microprocessors, devices of the next generation need very thin films of a thickness in the range of 40 to 50 Å. A bilateral tolerance for such a thin film is on the order of ±0.5 Å, which requires highly accurate thickness control.

Reduction in film thickness entails a problem in film thickness measuring techniques. For example, the thickness of a film formed on a semiconductor wafer increases gradually with time after the formation of the film and the thickness of the film cannot be accurately determined. FIG. 4 shows the dependence of the measured thickness of a thin film formed on a semiconductor wafer on time by way of example. FIG. 4 is a graph showing the variation of the measured thickness of a 100 Å thick thermal oxide film with time when the semiconductor wafer is left in a clean room after the formation of the thermal oxide film. As is obvious from FIG. 4, whereas the thickness of the thermal oxide film measured three minutes after formation of the thermal oxide film is 100 Å, which is equal to the initial thickness of the thermal oxide film, the thickness of the same thermal oxide film increases to about 101 Å in thirty minutes after formation of the thermal oxide film, and to about 103 Å in three hundred minutes after formation of the thermal oxide film.

Thus, the thickness of a film for use in devices of the next generation which allow a bilateral tolerance on the order of ±0.5 Å must be measured in three minutes after formation of the film to evaluate the film properly. One film forming apparatus must be used in combination with one film thickness measuring apparatus to measure the thickness of films formed by the film forming apparatus in three minutes after formation of the films, which increases the cost of a film forming system and is not realistic. Even if one film forming apparatus is used in combination with one film thickness measuring apparatus, a process schedule for processing the wafer after formation of a film on the wafer must be managed severely, which requires difficult process management.

SUMMARY OF THE INVENTION

The present invention has been made in view of the foregoing problems to solve those problems effectively. It is therefore an object of the present invention to provide a film thickness measuring apparatus which carries out film thickness measurement in an atmosphere of a purging gas containing only a very small amount of contaminants to suppress the variation of the measured film thickness.

The inventors of the present invention made earnest studies to find factors of the time-dependent variation of the measured film thickness and have made the present invention on the basis of knowledge acquired through the studies that the variation of the measured thickness is caused by the adhesion of contaminants, particularly, moisture and hydrocarbons, contained in the ambient atmosphere to the film.

According to the present invention, a film thickness measuring apparatus which measures the thickness of a thin film formed on a surface of a sample by transferring the sample from a sample receiving stage supporting the sample to a measuring table and irradiating the surface of the sample with a measuring light beam comprises covering structures hermetically covering a transfer chamber through which the sample workpiece is transferred from the sample receiving stage to the measuring table, and a measuring chamber in which the measuring table is disposed, and purging gas supply devices for supplying a high-purity purging gas containing only a very small amount of contaminants into the transfer chamber and the measuring chamber.

The sample placed on the sample receiving stage is taken into the transfer chamber hermetically covered with the covering structure, the sample is transferred to the measuring table disposed in the measuring chamber hermetically covered with the covering structure, and the surface of the sample mounted on the measuring table is irradiated with a measuring light beam to measure the thickness of a film formed on the surface of the sample. Since the transfer chamber and the measuring chamber are filled up with the high-purity purging gas containing only a very small amount of contaminants and supplied through the purging gas supply devices, only a very small amount of contaminants, such as moisture and hydrocarbons, adhere to the surface of the sample, so that the variation of the measured thickness of the film can be suppressed regardless of time elapsed after the formation of the film.

The purging gas is a dry gas having a dew point of, for example, $-50°$ C. or below, preferably, $-100°$ C. or below. Since the purging gas is highly dry, it is preferable to dispose an ionizer near the outlet of each purging gas supply device to avoid charging the purging gas with static electricity.

Preferably, the transfer chamber and the measuring chamber are kept at an internal pressure higher than that of the clean room in which the film thickness measuring apparatus is installed to prevent the gas prevailing in the clean room from leaking into the transfer chamber and the measuring chamber. If the transfer chamber and the measuring chamber are at an internal pressure higher than that of the clean room, the transfer chamber and the measuring chamber need not be perfectly hermetically sealed, and hence the covering structures do not need to seal the transfer chamber and the measuring chamber very highly hermetically.

The purging gas may be an inert gas, such as nitrogen gas or, if the safety of the operator must be taken into consideration, a mixed gas containing an inert gas and oxygen gas in a predetermined mixing ratio.

The adhesion of contaminants to the surface of the sample workpiece can be prevented by putting the sample in a cassette immediately after forming a film on the sample, placing a sealed cassette container containing the cassette holding a plurality of sample on the sample receiving stage, and taking the cassette container into the measuring chamber by a lifting table associated with the sample receiving stage,

BRIEF DESCRIPTION OF THE DRAWINGS

FIG. 2 is an enlarged schematic sectional view of a portion of the film thickness measuring apparatus of FIG. 1, including a sample receiving stage;

FIG. 3 is a perspective view of a cassette container transfer arm for transferring a cassette container;

DETAILED DESCRIPTION OF THE PREFERRED EMBODIMENT

Figure 1:
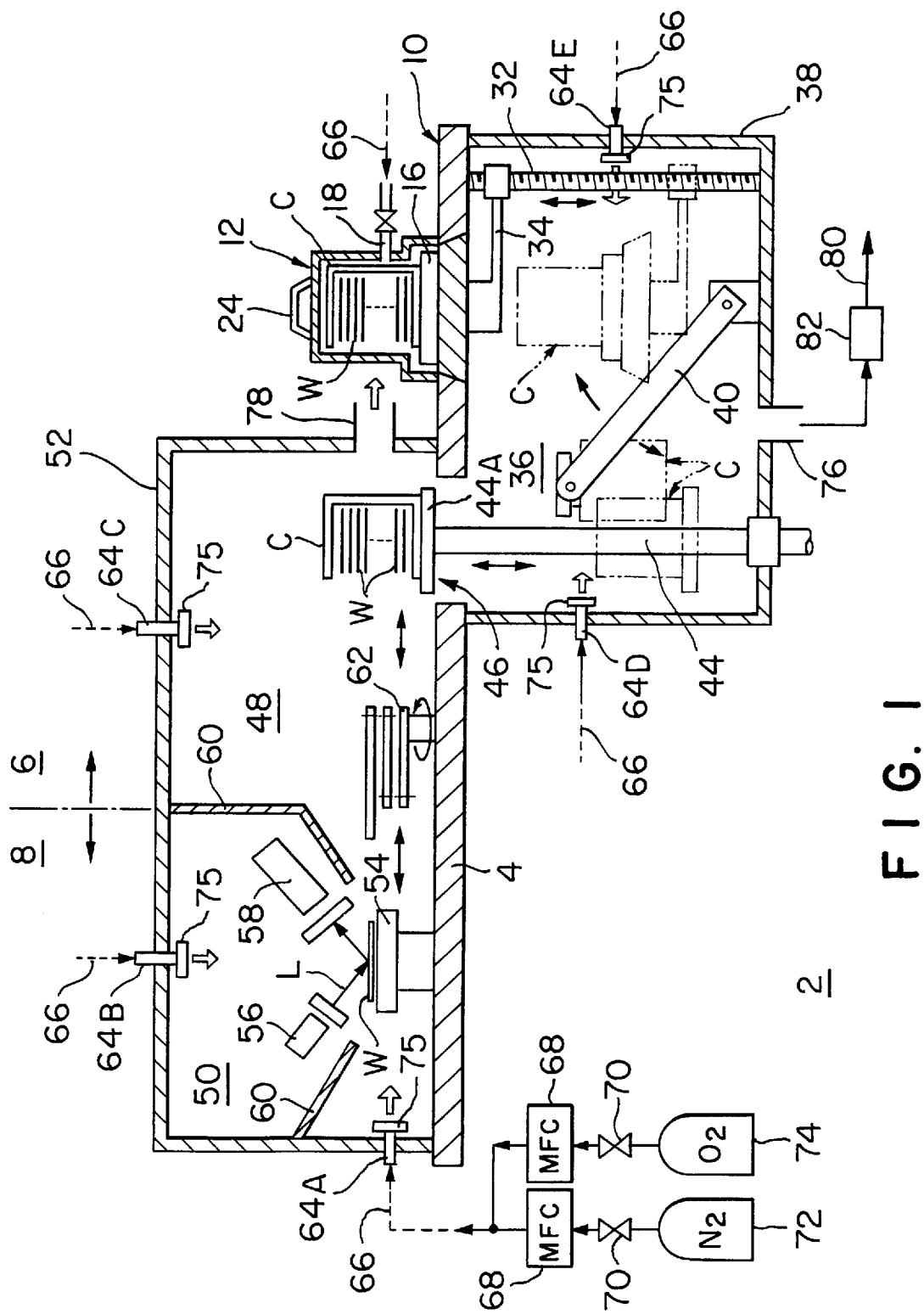
FIG. 1 is a schematic sectional view of a film thickness measuring apparatus in a preferred embodiment according to the present invention.
Figure 4:
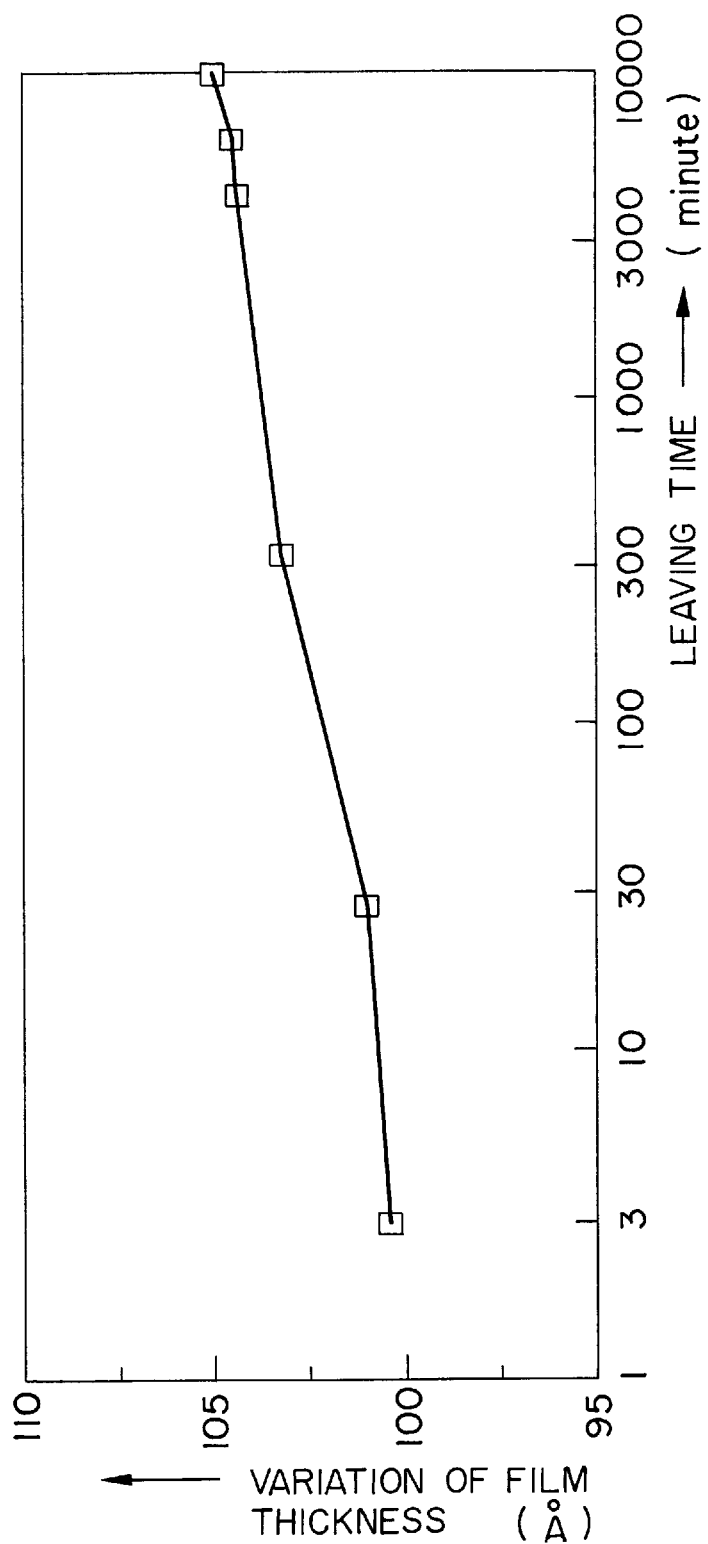
FIG. 4 is a graph showing the variation of the measured thickness of a thin film formed on a surface of a semiconductor wafer with respect to time.

A film thickness measuring apparatus in a preferred embodiment according to the present invention will be described hereinafter with reference to the accompanying drawings, in which FIG. 1 is a schematic sectional view of the film thickness measuring apparatus, FIG. 2 is an enlarged schematic sectional view of a portion including a sample receiving stage of the film thickness measuring apparatus of FIG. 1 and FIG. 3 is a perspective view of a cassette transfer arm for transferring a cassette.

Referring to FIG. 1, the film thickness measuring apparatus 2 has a base 4 having a transfer section, i.e., a right section as viewed in FIG. 1, extending in a transfer zone 6, and a measuring section, i.e., a left section as viewed in FIG. 1, extending in a measuring zone 8. The right end portion of the transfer section of the base 4 serves as a sample receiving stage 10. A sealed cassette container 12 containing a plurality of semiconductor wafers W is carried to and placed on the sample receiving stage 10 by an operator or an automatic carrying system, not shown.

As shown in FIG. 2, the sealed cassette container 12 has a box 14 of a size suitable for containing a cassette C, having an open lower end, and a lid 16 capable of hermetically closing the open lower end of the box 14. After putting the cassette C in the cassette container 12, the cassette container 12 is filled up with a highly-pure purging gas of a high cleanliness at an internal pressure higher than the atmospheric pressure. A purging gas supply pipe 18 provided with a valve is connected to the box 14 to supply the purging gas into the cassette container 12. The box 14 is provided with a grip 24 on the outer surface of the top wall thereof.

The lid 16 pressed against a flange 14A formed on the lower end of the box 14 through a sealing member, not shown, such as an O ring, to seal the box 14 hermetically. Retractable locking pins are arranged at proper positions in the periphery of the lid 16 so as to project from the circumference of the lid 16 and to be radially movable. The locking pins 20 are interlocked with a rotary linkage 22 held on a central portion of the lid 16. The rotary linkage 22 is operated to engage the locking pins 20 with and to disengage the same from the box 14. The box 14 and the lid 16 of the cassette container 12 are made of a polypropylene resin or the like, such as SMIF-POD (trade name) mentioned in JP-A No. 1-222429. Naturally the material forming the box 14 and the lid 16 is not limited to the foregoing material. The cassette C is capable of containing, for example, twenty-five wavers.

The sample receiving stage 10 on which the cassette container 12 is placed, is provided with a cassette receiving opening 26 of a diameter greater than the inside diameter of the flange 14A of the cassette container 12 and smaller than the outside diameter of the same, tapered outward and capable of passing the cassette C therethrough. A lifting table 28 having a tapered circumference corresponding to the cassette receiving opening 26 is fitted in the cassette receiving opening 26 so as to be moved downward away from and moved up to the sample receiving stage 10. The lifting table 28 is provided in its central portion with wrenching pins 30 capable of being engaged with the rotary linkage 22 held on the lid 16. The rotary linkage 22 is operated by the wrenching pins 30 to project the locking pins 20 from and to retract the same into the lid 16. Clamping members 29 are arranged around the cassette receiving opening 26 and pivotally supported on the outer surface of the sample receiving stage 10 so as to engage with the flange 14A of the box 14 to hold the box 14 fixedly on the sample receiving stage 10.

As shown in FIG. 1, the lifting table 28 is supported on an extremity of a cassette lifting arm 34 which is moved vertically by a ball screw. The lifting table 28 supporting the lid 16 and the cassette C mounted on the lid 16 is moved vertically downward leaving the box 14 on the sample receiving stage 10 to carry the cassette C into a cassette transfer chamber 36 defined by a covering structure 38 of a stainless steel or the like. The cassette transfer chamber 36 is isolated from the ambient by the covering structure 38.

A cassette transfer arm (first transfer arm) 40 is pivotally supported on the bottom wall of the covering structure 38 so as to be able to turn in a vertical plane. As shown in FIG. 3, a holding member 40A is supported pivotally on the extremity of the cassette transfer arm 40 so as to remain in a horizontal position regardless of the angular position of the cassette transfer arm 40. The holding member 40A is provided at the opposite ends of its lower surface with grippers 42. The cassette transfer arm 40 is turned upward, i.e., clockwise, as viewed in FIG. 1, to its upper limit position and the grippers 46 are operated to grip the cassette C located beneath the sample receiving stage 10 to carry the cassette C. A lifting table 44A included in a cassette lifting mechanism 44 is located at a position corresponding to the position of the holding member 40A when the cassette transfer arm 40 is turned downward, i.e., counterclockwise, as viewed in FIG. 1, to its lower limit position. The cassette transfer arm 40 carries the cassette C onto the lifting table 44A. A cassette transfer opening 46 is formed in a portion of the base 4 corresponding to the cassette lifting mechanism 44. The cassette lifting mechanism 44 carries the cassette C mounted on the lifting table 44A through the cassette transfer opening 46 into a wafer transfer chamber 48 (sample transfer chamber).

A measuring chamber 50 is contiguous with the wafer transfer chamber 48. The wafer transfer chamber 48 and the measuring chamber 50 are defined and separated from the ambient atmosphere by a covering structure 52 made of, for example, a stainless steel. A measuring table 54 for supporting a semiconductor wafer W, i.e., a sample, is disposed on the base 4 in the measuring chamber 50. An illuminating unit 56 for irradiating the surface of the semiconductor wafer W with a laser beam L, i.e., measuring light beam, is disposed obliquely above the measuring table 54, and a light receiving unit 58 for receiving the laser beam $L_1$ reflected from the surface of the semiconductor wafer W is disposed obliquely above the measuring table 54 and opposite to the illuminating unit 56 with respect to the semiconductor wafer W. The illuminating unit 56 and the light receiving unit 58 compose a film thickness measuring system. The thickness of a thin film formed on the surface of the semiconductor wafer W is determined, for example, on the basis of the phase difference between the laser beam L falling on the surface of the semiconductor wafer W and the laser beam L reflected from the surface of the semiconductor wafer W.

A partition wall 60 is disposed so as to separate only an upper portion of the measuring chamber 50 extending over the measuring table 54 from the wafer transfer chamber 48. The respective lower portions of the wafer transfer chamber 48 and the measuring chamber 50 are continuous with each other. A wafer transfer arm (second transfer arm) 62, such as an articulated arm, is disposed between the cassette transfer opening 46 and the measuring table 54 to transfer the semiconductor wafer W between the cassette C supported on the lifting table 44A and the measuring table 54.

Thus, the cassette transfer chamber 36, the wafer transfer chamber 48 and the measuring chamber 50 are covered with and separated from the ambient atmosphere by the covering structures 38 and 52, and the cassette transfer chamber 36, and therefore the wafer transfer chamber 48 and the measuring chamber 50 can be filled up with a highly-pure purging gas containing a very small amount of contaminants. For this purpose, purging gas supply nozzles 64A to 64E are arranged properly on the covering structures 38 and 52. More specifically, the purging gas supply nozzles 64A to 64E are attached to a portion of a side wall of the covering structure 52 near the measuring table 54, a portion of the top wall of the covering structure 52 extending over the measuring chamber 50, a portion of the top wall of the covering structure 52 extending over the wafer transfer chamber 48, and the opposite side walls of the covering structure 38 defining the cassette transfer chamber 36, respectively. The number and the positions of the purging gas supply nozzles 64A to 64E may be different from the foregoing number and the foregoing positions. The purging gas supply nozzles 64A to 64E are connected by gas supply pipes 66 through mass-flow controllers 68 and on-off valves 70 to an $N_2$ cylinder 72 and an $O_2$ cylinder 74, i.e., purging gas sources to supply a mixed purging gas of nitrogen gas and oxygen gas into the chambers 36, 38 and 60.

The cleanliness of the mixed purging gas with respect to particles is as high as that of an ordinary clean room, and the mixed purging gas is prepared so that moisture and hydrocarbon concentrations of the mixed purging gas can be very small. As regards moisture concentration, the nitrogen gas and the oxygen gas have dew points of, for example, $-50°$ C. or below, preferably, $-100°$ C. or below. Preferably, the nitrogen-to-oxygen mixing ratio is, in view of safety for the operator, for example, 4:1, which is nearly equal to the ratio of the nitrogen concentration to the oxygen concentration of air.

Since the mixed purging gas discharged through the purging gas supply nozzles 64A to 64E is a dry gas containing a very small amount of moisture, it is possible that the mixed purging gas is charged with static electricity. Therefore, ionizers 75 are attached to end portions of the purging gas supply nozzles 64A to 64E to electrically neutralize the mixed purging gas.

The covering structure 38 defining the cassette transfer chamber 36 and the covering structure 52 defining the wafer transfer chamber 52 are provided with discharge ports 76 and 78, respectively, to discharge the gas prevailing in the cassette transfer chamber 36 and the wafer transfer chamber 52 outside. The discharge ports 76 and 78 are connected to a discharge duct 80 connected to a plant exhaust system, not shown, and provided with an automatic pressure regulating valve 82 to provide for pressure variation in the plant exhaust system.

The operation of the film thickness measuring apparatus will be described hereinafter.

The operator or the automatic carrying system places the sealed cassette container 12 containing the cassette C at a predetermined position on the sample receiving stage 10, and engages the clamping members 29 with the flange 14A of the box 14 to clamp down the cassette container 12 on the sample receiving stage 10. The cassette C holds a plurality of wafers W, for example, twenty-five wafers W, to be subjected to film thickness measurement.

The cassette container 12 is filled up with the same purging gas as that filling up the internal space of the film thickness measuring apparatus, i.e., a purging gas scarcely containing impurities, such as moisture and hydrocarbons, as well as particles to prevent the surfaces of the wafers W from being contaminated with impurities and contaminants.

After the flange 14A has been clamped down on the sample receiving stage 10, the cassette lifting arm 34 is moved up to bring the wrenching pins 30 of the lifting table 28 into engagement with the rotary linkage 22 of the lid 16, the rotary linkage 22 is operated by the wrenching pins 30 to retract the locking pins 20 into the lid 16 to release the lid 16 from the flange 14A. Subsequently, the cassette lifting arm 34 is lowered to lower the lid 16 together with the cassette C mounted thereon in the cassette transfer chamber 36. In this state, the cassette receiving opening 26 is covered with the box 14 and hence the cassette transfer chamber 36 is separated from the ambient atmosphere.

After the cassette C has been thus taken into the cassette transfer chamber 36, the cassette transfer arm 40 is driven to grip the cassette C in its upper portion with the grippers 42 (FIG. 3), the cassette transfer arm 40 is turned counterclockwise, as viewed in FIG. 1, to transfer the cassette C from the cassette lifting arm 34 to the lifting table 44A. Then, the cassette lifting mechanism 44 is driven so that the lifting table 44A moves up to transfer the cassette C through the cassette transfer opening 46 from the cassette transfer chamber 36 to the wafer transfer chamber 48.

After the cassette C has been set in the wafer transfer chamber 48, the wafer transfer arm 62 installed in the wafer transfer chamber 48 is operated to transfer the wafer W from the cassette C to the measuring table 45. Then, a film thickness measuring procedure is carried out, that is, the illuminating unit 56 irradiates the surface of the wafer W mounted on the measuring table 54 with the laser beam L, and the light receiving unit 58 receives the laser beam L reflected from the wafer W to measure the thickness of a thin film formed on the surface of the wafer W. After the completion of the film thickness measuring procedure for the wafer W, the wafer transfer arm 62 returns the wafer W into the cassette C supported on the lifting table 44A, the height of the lifting table 44A is adjusted to enable the wafer transfer arm 62 to hold the next wafer W and to transfer the next wafer W to the measuring table 54, and the film thickness measuring procedure is repeated for the next wafer W. After film thickness measurement for all the wafers W contained in the cassette C has been completed, the foregoing operations are reversed to return the cassette C into the cassette container 12 and to seal the cassette container 12. Thus, the film thickness measuring operation is completed.

Since the internal space of the film thickness measuring apparatus is filled up with the purging gas during the film thickness measuring operation, the surfaces of the wafers W are not contaminated with particles, and contaminants, such as moisture and hydrocarbons, which are the main causes of film thickness variation, and, consequently, accurate film thickness measurement can be achieved. The mixed purging gas of high-purity nitrogen gas and high-purity oxygen gas is supplied through the purging gas supply nozzles 64A to 64E attached to the covering structures 38 and 52 into the film thickness measuring apparatus to fill up the cassette transfer chamber 36, the wafer transfer chamber 48 and the measuring chamber 50. Therefore, the surface of the wafer W is scarcely contaminated with moisture and such and, even if the wafer W is kept for a relatively long time in the film thickness measuring apparatus before film thickness measurement, the variation of the measured film thickness can be suppressed.

It is preferable that the internal pressures of the chambers 36, 48 and 50 are higher than the atmospheric pressure by several torrs to prevent the leakage of the clean air of the clean room containing a relatively large amount of moisture and such through faultily sealed portions of the film thickness measuring apparatus into the chambers 36, 48 and 50 50 that the adhesion of moisture and such to the surface of the wafer W can further effectively prevented.

Even if the pressure in the plant exhaust system to which the discharge duct 80 is connected is caused to vary by some cause, the chambers 36, 48 and 50 can be maintained at the internal pressure higher than the atmospheric pressure by the agency of the automatic pressure regulating valve 82 installed in the discharge duct 80, so that the leakage of the external air into the chambers 36, 48 and 50 can surely be prevented.

Although dependent on the number of the purging gas supply nozzles and the volume of the internal space of the film thickness measuring apparatus, the flow rate of the purging gas supplied through each of the purging gas supply nozzles 64A to 64E is, for example, on the order of 50 1/mm at a maximum.

It is possible that the purging gas is charged with static electricity when the highly dry purging gas flows through gas passages into the internal space of the film thickness measuring apparatus and exerts various adverse effects on the film thickness measuring system. However, the purging gas supply nozzles 64A to 64E are provided with the ionizers 75, respectively, to electrically neutralize the purging gas, so that the adverse effects on the film thickness measuring system can be avoided.

The adhesion of moisture and such to the wafers can further effectively prevented by supplying the purging gas through the purging gas supply pipe 18 into the cassette container 12.

The chambers 36, 48 and 50 are covered with the covering structures 38 and 52 considerably highly hermetically. However, a desired object to prevent the adhesion of moisture and such to the surface of the wafer can be achieved even if the chambers 36, 48 and 50 are not very highly hermetically sealed, when the internal pressure of the film thickness measuring apparatus is higher than that of the ambient atmosphere Nitrogen gas may be used as the purging gas instead of the mixed gas of nitrogen gas and oxygen gas. The purging gas may be other inert gas, such as argon gas, helium gas or a mixed gas of argon gas and helium gas.

Although the film thickness measuring apparatus of the present invention has been described as applied to the measurement of the thickness of a thermal oxide film, the present invention is applicable to the measurement of a film deposited by CVD. The sample is not limited to a semiconductor wafer. Naturally, the film thickness measuring apparatus of the present invention is applicable to measuring the thickness of films formed on glass substrates and LCD substrates.

As is apparent from the foregoing description, the film thickness measuring apparatus of the present invention exercises the following excellent functions.

The surface of the sample is scarcely contaminated with contaminants, such as moisture and hydrocarbons, not to mention particles, because the transfer chamber and the measuring chamber are covered with the covering structures and are filled up with the purging gas.

Accordingly, the thickness of a film formed on a sample does not vary with time and can be accurately measured even if the sample is kept for a time in the film thickness measuring apparatus before film thickness measurement.

The time management of the sample after film formation is unnecessary.

The ionizers electrically neutralize the purging gas to eliminate adverse effects of static electricity.

Safety for the operator can be secured by adjusting the $O_2$ concentration of the purging gas to a predetermined value.

Figure 5:
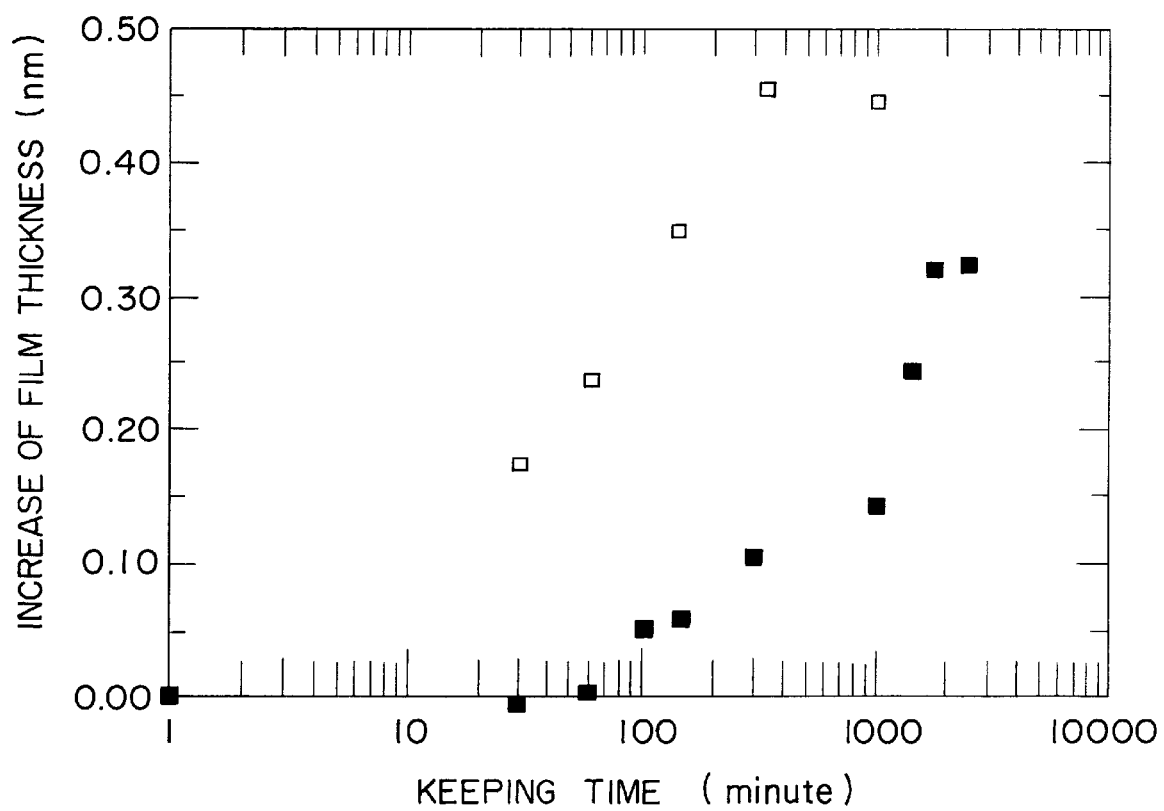
FIG. 5 is a graph of assistance in specifically explaining the effects of the film thickness measuring apparatus of the present invention.

FIG. 5 is a graph showing the increase of measured thickness of oxide films formed on semiconductor wafers with time.

In FIG. 5, solid squares indicate the increase of the thickness of an oxide film formed on a semiconductor wafer with time when the semiconductor wafer was kept in the film thickness measuring apparatus of the present invention provided with the purging gas supply nozzles 64A to 64E after film formation (process in accordance with the present invention), and blank squares indicate the increase of the thickness of an oxide film formed on a semiconductor wafer with time when the semiconductor wafer was kept in a clean room after film formation (conventional process).

As is obvious from FIG. 5, the rate of increase in thickness of the oxide film when the sample is kept in the film thickness measuring apparatus of the present invention is far less than that of the oxide film when the sample is kept in the clean room.

What is claimed is:

1. A film thickness measuring apparatus comprising:
   a sample receiving stage for receiving a sample;
   a measuring space covering structure defining a measuring space;
   a measuring table for supporting a sample, disposed in the measuring space covered with the measuring space covering structure;
   a film thickness measuring system comprising an illuminating unit for irradiating a surface of the sample supported on the measuring table with a measuring light beam, and a light receiving unit for receiving the measuring light beam reflected from the surface of the sample;
   a transfer space covering structure disposed between the sample receiving stage and the measuring space covering structure to define a transfer space; and
   a transfer mechanism disposed in the transfer space to transfer the sample from the sample receiving stage to the measuring
   wherein the measuring space covering structure and the transfer space covering structure are provided with purging gas supply devices for supplying a purging gas containing only a small amount of contaminants into the measuring space and the transfer.

2. The film thickness measuring apparatus according to claim 1, wherein the measuring space covering structure and the transfer space covering structure are provided at positions near the purging gas supply devices with ionizers for electrically neutralizing the purging gas supplied through the purging gas supply devices into the measuring space and the transfer space.

3. The film thickness measuring apparatus according to claim 1, wherein the purging gas supply devices supply, as the purging gas, an inert gas or a mixed gas of an inert gas and oxygen gas.

4. The film thickness measuring apparatus according to claim 1, wherein the purging gas supply devices supply the purging gas having a dew point of −50° C. or below.

5. The film thickness measuring apparatus according to claim 1, wherein the purging gas supply devices supply the purging gas into the measuring space and the transfer space so that the measuring space and the transfer space are kept at an internal pressure higher than a pressure of an ambient atmosphere surrounding the measuring space and the transfer space.

6. The film thickness measuring apparatus according to claim 1, wherein the sample placed on the sample receiving stage is held in a cassette contained in a sealed cassette container.

7. The film thickness measuring apparatus according to claim 1, wherein a lifting table for supporting a cassette contained in a sealed cassette container is incorporated into the sample receiving stage, and the lifting table is moved vertically between a position on the sample receiving stage and a position in the transfer space under the sample receiving stage.

8. The film thickness measuring apparatus according to claim 7, wherein the transfer space defined by the transfer space covering structure is divided into a cassette transfer space and a sample transfer space, and the lifting table is moved down into the cassette transfer space to carry the cassette.

9. The film thickness measuring apparatus according to claim 8, wherein a first transfer arm for taking out the cassette supported on the lifting table, and a cassette lifting mechanism for transferring the cassette from the first transfer arm to the sample transfer space.

10. The film thickness measuring apparatus according to claim 9, wherein a second transfer arm is disposed in the sample transfer space to transfer a sample from the cassette to the measuring table.

11. The film thickness measuring apparatus according to claim 1, wherein the measuring space covering structure and the transfer space covering structure are formed integrally in a single covering structure, and a space covered with the single covering structure is partitioned into the measuring space and the transfer space by a partition wall.

12. The film thickness measuring apparatus according to claim 1, wherein an exhaust system for discharging gases from the measuring space and the transfer space is connected to either the measuring space covering structure or the transfer space covering structure.

* * * * *